United States Patent
Carney et al.

(10) Patent No.: US 8,526,032 B2
(45) Date of Patent: Sep. 3, 2013

(54) CONCURRENT IPDS AND NON-IPDS PRINT PROCESSING

(75) Inventors: Dennis M. Carney, Louisville, CO (US); Allan A. Hren, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 1859 days.

(21) Appl. No.: 11/394,837

(22) Filed: Mar. 31, 2006

(65) Prior Publication Data
US 2007/0236716 A1   Oct. 11, 2007

(51) Int. Cl.
*G06F 3/12*   (2006.01)

(52) U.S. Cl.
USPC ........................................ 358/1.15

(58) Field of Classification Search
USPC ........................................ 358/1.15
See application file for complete search history.

(56) References Cited

U.S. PATENT DOCUMENTS

| | | | |
|---|---|---|---|
| 5,982,997 A * | 11/1999 | Stone et al. | 358/1.15 |
| 6,373,585 B1 | 4/2002 | Mastie et al. | |
| 2003/0086098 A1 | 5/2003 | Sesek et al. | |
| 2004/0036909 A1 * | 2/2004 | Soma et al. | 358/1.15 |
| 2004/0145586 A1 * | 7/2004 | Jacobsen | 345/441 |

OTHER PUBLICATIONS

Xerox Phaser 1235 Printer Brochure, 2000.
Xerox DocuColor 2060 NPS/IPS Color Controller summary, Mar. 31, 2006.
Huff, Rich "Digital Front Ends", Sep. 3, 2005.
The Seybold Report on Publishing Systems, vol. 26, No. 12, Mar. 10, 1997; "Custom Printing with Chromapress".

* cited by examiner

*Primary Examiner* — Jeremiah Bryar
(74) *Attorney, Agent, or Firm* — Duft Bornsen & Fettig, LLP

(57) ABSTRACT

Concurrent IPDS and non-IPDS print processing is provided. Because an IPDS print session may not usually be interrupted, non-IPDS print data is received through a separate, non-IPDS channel in the printer control unit. The non-IPDS data is rasterized ("ripped") using spare processing cycles and stored in a rip spool. At an appropriate time, such as when fully rasterized, an interrupt request may be submitted to the IPDS host then controlling the printer. When the IPDS host relinquishes control of the printer, such as when the IPDS print job has been completed, the rasterized non-IPDS print data may be de-spooled to the print engine and printed.

16 Claims, 2 Drawing Sheets

US 8,526,032 B2

CONCURRENT IPDS AND NON-IPDS PRINT PROCESSING

TECHNICAL FIELD

The present invention relates generally to high end, workgroup and mainframe attached printers and, in particular, to more efficiently using printer resources during IPDS™ (Intelligent Printer Data Stream™) processing.

BACKGROUND ART

Business and comparable communications have become extremely complex. Variables on a page include color, text, image and graphics. Production choices include traditional offset, digital high-speed print, continuous-forms print and cut-sheet print. Delivery options include HTML, e-mail, fax and screen. Further complicating the production process is the variety of industry formats, including EPS, PDF, TIFF, JPEG, XML PostScript® and PCL.

IPDS™ (Intelligent Printer Data Stream™) was developed by IBM® as a host-to-printer data stream or language for controlling and managing all-points-addressable printers to allow the presentation of pages containing a wide range of different data types. Without providing details, IPDS contains the information necessary to identify, monitor and control the functions of certain printers which are used in high end workgroup and mainframe environments (as well as other environments). The information includes the characteristics of the printer, its resolution, its available resources and its memory, among others. An IPDS compatible printer may be driven at the highest possible speed and with the greatest use of its functions by allowing the output of different, independent source data to be merged at print time, resulting in an integrated, mixed-data printed page.

However, once an IPDS job has been submitted by a host to a printer and the IPDS session has been opened, the IPDS session "owns" the printer and expects that there are no other jobs printing. Consequently, when a non-IPDS print job is sent to the printer, it must wait until the IPDS host relinquishes the printer before rasterizing (or ripping) of the non-IPDS data can even begin. If printing begins after some of the data has been ripped ("concurrent rip and print") but the printer prints faster than ripped data is available, the printer must pause. However, pausing may damage certain printers, such as continuous forms printers. Therefore, it is preferable to fully rip the data before beginning to print. However, because ripping a large print job may take a long time, the printer may remain idle for that period until ripping is complete which is expensive in both time and resources.

Consequently, a more efficient use of printer resources remains desirable.

SUMMARY OF THE INVENTION

The present invention provides concurrent IPDS and non-IPDS print processing. Because an IPDS print session may not usually be interrupted, non-IPDS print data is received through a separate, non-IPDS channel in the printer control unit. The non-IPDS data is rasterized ("ripped") using spare processing cycles and stored in a rip spool. At an appropriate time, such as when the data is fully rasterized, an interrupt request may be submitted to the IPDS host then controlling the printer. When the IPDS host relinquishes control of the printer, such as when the IPDS print job has been completed, the rasterized non-IPDS print data may be de-spooled to the print engine and printed. Thus, a more efficient use of printing resources is provided.

DETAILED DESCRIPTION OF THE PREFERRED EMBODIMENT

Figure 1:
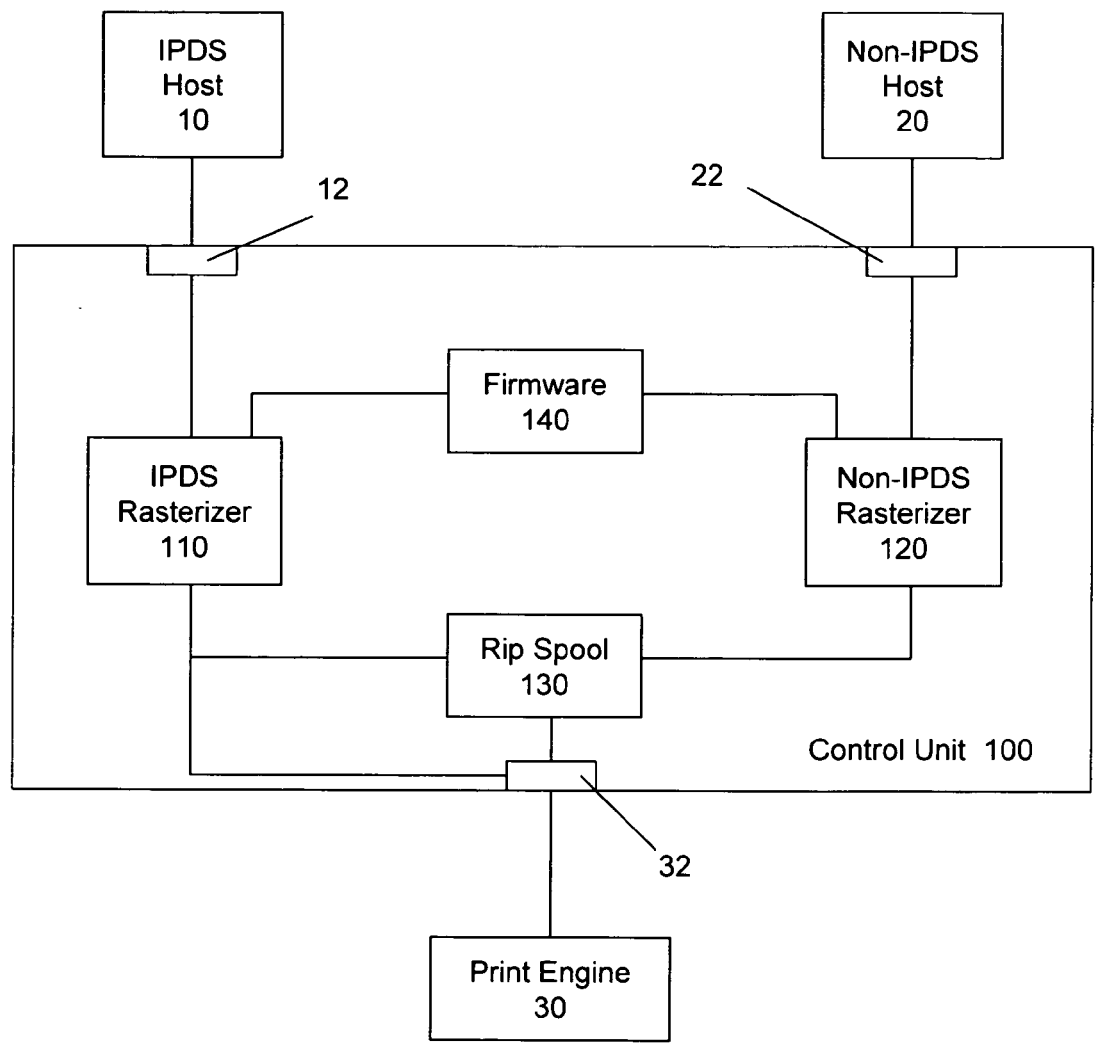
FIG. 1 is a block diagram of a printer control unit in which the present invention may be implemented.

FIG. 1 is a block diagram of a printer control unit 100 in which the present invention may be implemented. The control unit 100 is attached to one or more host devices, such as an IPDS host 10 and a non-IPDS host 20, through IPDS and non-IPDS host interfaces 12 and 22, respectively. The non-IPDS 20 host may employ such non-IPDS print formats as EPS, PDF, TIFF, JPEG, XML PostScript® PCL and/or others. Functionally coupled to the IPDS interface 12 in the control unit 100 is an IPDS rasterizer 110 for rasterizing or "ripping" incoming IPDS print data into bits which indicate where dots are to be printed on a page. Similarly, functionally coupled to the non-IPDS interface 22 in the control unit 100 is a non-IPDS rasterizer 120 for rasterizing or ripping incoming non-IPDS print data. Rasterized IPDS data may be sent from the IPDS rasterizer 110 to a rip spool 130 for temporary storage and through an interface 32 to a print engine 30 where a print job is completed. Alternatively, the IPDS rasterizer 110 may send rasterized data directly through the interface 32 to the print engine 30. Rasterized non-IPDS data may be sent from the non-IPDS rasterizer 120 to the rip spool 130 for temporary storage and through the interface 32 to the print engine 30. The present invention makes use of both data paths, one for IPDS print jobs and the other for non-IPDS print jobs. Firmware 140 provides control for the components. The control unit 100 may be integrated into the print engine 30 or may be external to the print engine 30.

Figure 2:
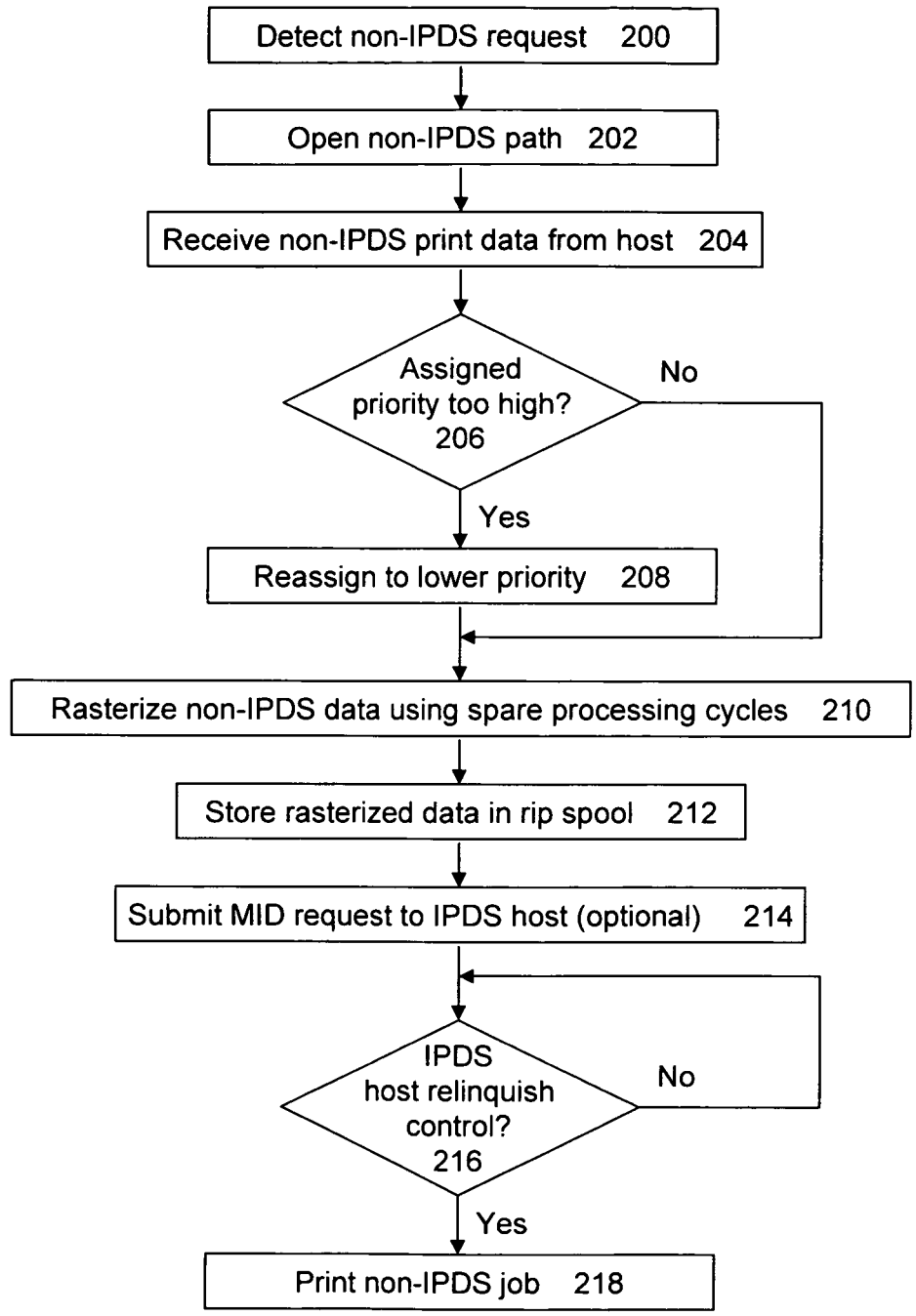
FIG. 2 is a flowchart of a method of the present invention.

Referring to the flowchart of FIG. 2, in operation, a "listener" will detect a request from the non-IPDS host 20 for a printer connection, such as via a TCP/IP connection (step 200). A check is made to determine whether an IPDS print session is active. A typical example of an active IPDS print session is IPDS print data being processed. If so, the IPDS session being executed "owns" the printer and prevents other, non-IPDS, print jobs to be printed. However, in accordance with the present invention, the control unit 100 opens the non-IPDS path (step 202) and receives the non-IPDS print data from the host (step 204). If the non-IPDS print job has been assigned a high priority (step 206), it is reassigned to a lower priority (step 208). Alternatively, non-IPDS print jobs may be initially assigned to lower priorities than IPDS print jobs, thereby avoiding reassigning priorities later in the process.

Using spare processing cycles, the non-IPDS data is rasterized (step 210) and the results stored in the rip spool 130 (step 212). Thus, non-IPDS processing may effectively occur concurrently while an IPDS session is active, including while IPDS data is being processed. After the non-IPDS data has been fully rasterized and stored, the control unit 100 may submit an interrupt request, such as an MID ("managed IPDS dialog") request, to the IPDS host 10 (step 214). Alternatively, the control unit 100 may submit the interrupt request before the non-IPDS data is fully rasterized. For example, after the non-IPDS data has been at least partially rasterized, the control unit 100 may examine the portion of the non-IPDS which has been rasterized, the speed with which the remainder can be rasterized and the speed with which the print engine 30 can print the pages of the particular print job. The control unit 100 may then submit an interrupt request at an appropriate time calculated to ensure that, if the request is granted, the control unit 100 will be able to rasterize the remainder of the non-IPDS data at least as fast as the print engine 30 can print. Such a process improves efficiency by reducing or eliminating idle time in the print engine 30.

Upon receiving an interrupt request, the IPDS host 10 may interrupt the IPDS session and allow the rasterized non-IPDS to be de-spooled and printed. Alternatively, the IPDS host may ignore the request (and some IPDS sessions may never accept an MID request). If the control unit 100 does not submit an interrupt request, or if such a request is ignored, the control unit 100 waits until the IPDS session is completed and the IPDS host 10 has relinquished control of the printer (step 216). The rasterized non-IPDS print job may then be de-spooled from the rip spool 130 to the print engine 30 to be printed (step 218). Preferably, more than one non-IPDS print job may be processed and stored in the rip spool 130 until the IPDS session has been completed.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of media actually used to carry out the distribution. Examples of computer readable media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for processing a non-IPDS print job concurrently with an IPDS print job or a method for deploying computing infrastructure comprising integrating computer readable code into a computing system for processing a non-IPDS print job concurrently with an IPDS print job.

What is claimed is:

1. A method of processing a non Intelligent Printer Data Stream (IPDS) print job during an active IPDS print session on a printer, the method comprising:
    initiating an active IPDS print session on the printer;
    receiving a request at the printer from a non-IPDS host to process a non-IPDS print job during the active IPDS print session;
    receiving a non-IPDS print job at the printer from the non-IPDS host during the active IPDS print session;
    rasterizing the non-IPDS print job on the printer during the active IPDS print session; and
    printing the non-IPDS print job on the printer responsive to terminating the active IPDS print session on the printer.

2. The method of claim 1 wherein printing the non-IPDS print job further comprises:
    printing the non-IPDS print job on the printer responsive to transmitting a Manage IPDS Dialog (MID) command to the IPDS host to terminate the active IPDS print session on the printer.

3. The method of claim 1 wherein rasterizing the non-IPDS print job further comprises:
    rasterizing the non-IPDS print job concurrently with rasterizing an IPDS print job.

4. The method of claim 1 wherein rasterizing the non-IPDS print job further comprises:
    partially rasterizing the non-IPDS print job;
    determining a speed of rasterizing a non-rasterized portion of the non-IPDS print job;
    determining a speed of printing the non-IPDS print job; and
    terminating the active IPDS print session on the printer based on the speed of rasterizing the non-rasterized portion of the non-IPDS print job and the speed of printing the non-IPDS print job such that rasterizing the non-rasterized portion is performed at least as fast as printing the non-IPDS print job to reduce an idle time on the printer.

5. A printer controller operable to process a non Intelligent Printer Data Stream (IPDS) print job during an active IPDS print session, the printer controller comprising:
    an IPDS interface operable to receive a request to initiate an active IPDS print session and to receive a non-IPDS print job from the non-IPDS host during the active IPDS print session;
    a non-IPDS rasterizer operable to receive a request from the non-IPDS host to process a non-IPDS print job during the active IPDS print session and to rasterize the non-IPDS print job during the active IPDS print session; and
    a print engine interface operable to transmit the rasterized non-IPDS print job to a print engine responsive to terminating the active IPDS print session.

6. The printer controller of claim 5 further comprising:
    an IPDS interface operable to transmit a Manage IPDS Dialog (MID) command to the IPDS host to terminate the active IPDS print session,
    wherein the print engine interface is further operable to transmit the non-IPDS print job to the print engine responsive to transmitting the MID command to the IPDS host to terminate the active IPDS print session.

7. The printer controller of claim 5 further comprising:
    an IPDS rasterizer operable to rasterize an IPDS print job,
    wherein the non-IPDS rasterizer is further operable to rasterize the non-IPDS print job concurrent with the IPDS rasterizer rasterizing the IPDS print job.

8. The printer controller of claim 5 wherein:
    the non-IPDS rasterizer is further operable to partially rasterize the non-IPDS print job and to determine a speed of rasterizing a non-rasterized portion of the non-IPDS print job,
    the print engine interface is further operable to communicate with the print engine to determine a speed of printing the non-IPDS print job, and
    the IPDS interface is further operable to communicate with the IPDS host to terminate the active IPDS print session on the printer based on the speed of rasterizing the non-rasterized portion of the non-IPDS print job and the speed of printing the non-IPDS print job such that rasterizing the non-rasterized portion is performed at least as fast as printing the non-IPDS print job to reduce an idle time on the printer.

9. A non-transitory computer readable medium tangibly embodying programmed instructions which, when executed by a computer system, are operable to perform a method of processing a non Intelligent Printer Data Stream (IPDS) print job during an active IPDS print session on a printer, the method comprising:

initiating an active IPDS print session on the printer;

receiving a request at the printer from a non-IPDS host to process a non-IPDS print job during the active IPDS print session;

receiving a non-IPDS print job at the printer from the non-IPDS host during the active IPDS print session;

rasterizing the non-IPDS print job on the printer during the active IPDS print session; and printing the non-IPDS print job on the printer responsive to terminating the active IPDS print session on the printer.

10. The non-transitory computer readable medium of claim 9 wherein the method further comprises:

printing the non-IPDS print job on the printer responsive to transmitting a Manage IPDS Dialog (MID) command to the IPDS host to terminate the active IPDS print session on the printer.

11. The non-transitory computer readable medium of claim 9 wherein the method further comprises:

rasterizing the non-IPDS print job concurrently with rasterizing an IPDS print job.

12. The non-transitory computer readable medium of claim 9 wherein the method further comprises:

partially rasterizing the non-IPDS print job;

determining a speed of rasterizing a non-rasterized portion of the non-IPDS print job;

determining a speed of printing the non-IPDS print job; and terminating the active IPDS print session on the printer based on the speed of rasterizing the non-rasterized portion of the non-IPDS print job and the speed of printing the non-IPDS print job such that rasterizing the non-rasterized portion is performed at least as fast as printing the non-IPDS print job to reduce an idle time on the printer.

13. A method of deploying computing infrastructure, comprising integrating computer readable code into a computing system, the code operable to process a non Intelligent Printer Data Stream (IPDS) print job during an active IPDS print session on a printer, wherein the computer readable code, in combination with the computing system, is capable of performing the following:

initiating an active IPDS print session on the printer;

receiving a request at the printer from a non-IPDS host to process a non-IPDS print job during the active IPDS print session;

receiving a non-IPDS print job at the printer from the non-IPDS host during the active IPDS print session;

rasterizing the non-IPDS print job on the printer during the active IPDS print session; and printing the non-IPDS print job on the printer responsive to terminating the active IPDS print session on the printer.

14. The method of claim 13 wherein printing the non-IPDS print job further comprises:

printing the non-IPDS print job on the printer responsive to transmitting a Manage IPDS Dialog (MID) command to the IPDS host to terminate the active IPDS print session on the printer.

15. The method of claim 13 wherein rasterizing the non-IPDS print job further comprises:

rasterizing the non-IPDS print job concurrently with rasterizing an IPDS print job.

16. The method of claim 13 wherein rasterizing the non-IPDS print job further comprises:

partially rasterizing the non-IPDS print job;

determining a speed of rasterizing a non-rasterized portion of the non-IPDS print job;

determining a speed of printing the non-IPDS print job; and terminating the active IPDS print session on the printer based on the speed of rasterizing the non-rasterized portion of the non-IPDS print job and the speed of printing the non-IPDS print job such that rasterizing the non-rasterized portion is performed at least as fast as printing the non-IPDS print job to reduce an idle time on the printer.

* * * * *